(12) United States Patent
Nakagawa

(10) Patent No.: US 9,467,067 B2
(45) Date of Patent: Oct. 11, 2016

(54) POWER CONVERTER

(75) Inventor: Ryosuke Nakagawa, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/384,881

(22) PCT Filed: Mar. 12, 2012

(86) PCT No.: PCT/JP2012/056283
§ 371 (c)(1),
(2), (4) Date: Sep. 12, 2014

(87) PCT Pub. No.: WO2013/136415
PCT Pub. Date: Sep. 19, 2013

(65) Prior Publication Data
US 2015/0023083 A1 Jan. 22, 2015

(51) Int. Cl.
*H03H 7/01* (2006.01)
*H02M 7/5387* (2007.01)
*H02M 1/12* (2006.01)

(52) U.S. Cl.
CPC ........... *H02M 7/5387* (2013.01); *H02M 1/126* (2013.01)

(58) Field of Classification Search
CPC ...... H02M 1/12; H02M 1/32; H02M 7/5395; H02M 7/5387; H02M 7/537; H03H 1/0007; H03H 7/0115; H03H 7/06
USPC ........ 363/40–41, 55, 56.01, 56.02, 131–132; 333/168, 172, 175, 176, 181, 167, 185
See application file for complete search history.

(56) References Cited

U.S. PATENT DOCUMENTS

2012/0081193 A1* 4/2012 Shirakawa ............... H03H 7/06
333/176
2012/0307540 A1* 12/2012 Tagome ................ H02M 1/088
363/131

FOREIGN PATENT DOCUMENTS

JP 9-117126 A 5/1997
JP 2000-209869 A 7/2000
(Continued)

OTHER PUBLICATIONS

International Search Report (PCT/ISA/210) mailed on May 22, 2012, by the Japanese Patent Office as the International Searching Authority for International Application No. PCT/JP2012/056283.
(Continued)

*Primary Examiner* — Nguyen Tran
(74) *Attorney, Agent, or Firm* — Buchanan Ingersoll & Rooney PC

(57) ABSTRACT

In a filter capacitor including three capacitor elements including a first capacitor element at an end on one side in an electrical connection form and a second capacitor element at an end on the other side, a pair of direct-current terminals including a positive-electrode-side main terminal and a negative-electrode-side main terminal, which receive a direct-current voltage from a direct-current power supply, are provided, a first conductor path length between a positive-electrode-side terminal of the first capacitor element and the positive-electrode-side main terminal and a second conductor path length between a positive-electrode-side terminal of the second capacitor element and the positive-electrode-side main terminal are approximately the same, and a third conductor path length between a negative-electrode-side terminal of the first capacitor element and the negative-electrode-side main terminal and a fourth conductor path length between the negative-electrode-side terminal of the second capacitor element and the negative-electrode-side main terminal are approximately the same.

8 Claims, 8 Drawing Sheets

(56) References Cited

FOREIGN PATENT DOCUMENTS

| JP | 2004-040944 A | 2/2004 |
|---|---|---|
| JP | 2004-056984 A | 2/2004 |
| JP | 2010-030489 A | 2/2010 |
| JP | 2010-288415 A | 12/2010 |
| JP | 2011-135769 A | 7/2011 |
| JP | 2012-029404 A | 2/2012 |
| WO | WO 2011/006505 A1 | 1/2011 |

OTHER PUBLICATIONS

Written Opinion (PCT/ISA/237) mailed on May 22, 2012, by the Japanese Patent Office as the International Searching Authority for International Application No. PCT/JP2012/056283 (with English language translation, 4 pages).

* cited by examiner

FIG.5

◆INDUCTANCE VALUE AMONG CAPACITOR ELEMENTS=10nH

| FRE-QUENCY (kHz) | ELECTRIC CURRENT (A) | | | | | |
|---|---|---|---|---|---|---|
| | C11 | C12 | C13 | C21 | C22 | C23 |
| 10 | 305 | 339 | 356 | 331 | 339 | 331 |
| 20 | 231 | 354 | 429 | 323 | 354 | 323 |
| 50 | 836 | 413 | 549 | 307 | 413 | 307 |
| 70 | 941 | 410 | 324 | 341 | 410 | 341 |
| 100 | 969 | 346 | 157 | 409 | 346 | 409 |
| 500 | 1007 | 72 | 7 | 499 | 72 | 499 |
| 1000 | 1003 | 36 | 4 | 500 | 35 | 500 |

FIG.8

◆ INDUCTANCE VALUE AMONG CAPACITOR ELEMENTS=5nH

| FRE-QUENCY (kHz) | ELECTRIC CURRENT (A) | | | | | |
|---|---|---|---|---|---|---|
| | C11 | C12 | C13 | C21 | C22 | C23 |
| 10 | 320 | 336 | 344 | 322 | 336 | 322 |
| 20 | 284 | 343 | 375 | 328 | 343 | 328 |
| 50 | 402 | 371 | 489 | 317 | 371 | 317 |
| 70 | 652 | 379 | 446 | 319 | 379 | 319 |
| 100 | 815 | 371 | 310 | 339 | 371 | 339 |
| 500 | 984 | 137 | 20 | 483 | 137 | 483 |
| 1000 | 996 | 71 | 5 | 495 | 71 | 495 |

POWER CONVERTER

FIELD

The present invention relates to a power converter including a filter capacitor configured from a plurality of capacitor elements.

BACKGROUND

For example, in the conventional power converter described in Patent Literature 1, a filter capacitor that smoothes a direct-current voltage includes a plurality of capacitor elements (in the literature, ten capacitor elements are exemplified) connected in parallel to one another and includes a pair of first direct-current terminals connected to a direct-current power supply and a pair of second direct-current terminals connected to an inverter unit. In the filter capacitor configured in this way, a direct-current voltage is supplied by the direct-current power supply from the side of the pair of first direct-current terminals provided on one side of the filter capacitor. The direct-current voltage is output to the inverter unit from the side of the pair of second direct-current terminals provided on the other side the filter capacitor.

In the conventional power converter, the filter capacitor includes a plurality of capacitor elements because large direct-current power cannot be accumulated in only one capacitor element. In this case, the capacitor elements are inevitably connected in parallel to one another.

CITATION LIST

Patent Literature

Patent Literature 1: Japanese Patent Application Laid-Open No. 2004-56984

SUMMARY

Technical Problem

However, in the case of the configuration in which a plurality of capacitor elements are connected in parallel to one another as in the power converter described in Patent Literature 1, the magnitudes of the inductances of connection conductors that connect positive and negative electrodes of the capacitor elements pose a problem.

It is a widely known fact that, when the inductance of the connection conductors is large, the surge voltage generated in the switching elements of an inverter unit is large. On the other hand, the inventors of the present application have found that, when there is a difference in the inductances of the connection conductors that connect the capacitor elements, fluctuations occur in the amount of heat generated among the capacitor elements.

For example, in the case of the configuration of Patent Literature 1, the amount of heat generated in the capacitor element closest to the first direct-current terminals is large. The amount of heat generated in the capacitor element decreases with the distance from the first direct-current terminals. In the case of the power converter, the charge accumulated in the filter capacitor is supplied to a load according to ON/OFF of the switching elements of the inverter unit. In this case, an electric current flows from the direct-current power supply to the filter capacitor to supplement a decrease in the accumulated charge of the filter capacitor; however, most of the electric current tends to flow to the capacitor element closest to the first direct-current terminals. Therefore, the electric current concentrates in this capacitor element and thus the amount of heat generated in this capacitor element is considered to increase.

For example, in the case of a power converter for a railroad use, the allowable temperature of the switching elements is about 120 to 130° C. On the other hand, in a heat-sensitive filter capacitor, in order to maintain the performance of the filter capacitor and suppress a decrease in life, it is necessary to keep the capacitor elements at, for example, a temperature equal to or lower than 80° C. Therefore, in attaining the balance of the performance of the filter capacitor and costs, it is an important element to suppress the electric current from concentrating in a specific capacitor element and restrain fluctuations in temperature rises among the capacitor elements (i.e., temperature equalization for the capacitor elements). In particular, in a recent power converter, there is a tendency to increase the carrier frequency and increase the switching speed of the switching elements. Therefore, a filter capacitor is also easily affected by the magnitudes of the inductances of connector conductors. It is no exaggeration to say that the demand for temperature equalization for capacitor elements is increasing.

The present invention has been devised in view of the above and it is an object of the present invention to provide a power converter that can suppress fluctuations in temperature rises among capacitor elements and restrain deterioration in the performance and the life of a filter capacitor.

Solution to Problem

In order to solve the above problems and achieve the object, the present invention relates to a power converter that includes a filter capacitor that receives a direct-current voltage from a direct-current power supply and an inverter unit that drives a load using electric energy accumulated in the filter capacitor, wherein in the filter capacitor, a plurality of capacitor elements connected in parallel are provided and a first direct-current terminal, which includes a positive-electrode-side main terminal and a negative-electrode-side main terminal that receive a direct-current voltage from the direct-current power supply, is provided, and a first inductance component in a conductor portion that electrically connects a positive-electrode-side terminal of a first capacitor element, which is located on one end side in an electrical connection form among the capacitor elements, and a positive-electrode-side main terminal of the first direct-current terminal and a second inductance component in a conductor portion that electrically connects a positive-electrode-side terminal of a second capacitor element, which is located on another end side in the electrical connection form, and a positive-electrode-side main terminal of the first direct-current terminal are configured to be approximately same and a third inductance component in a conductor portion that electrically connects a negative-electrode-side terminal of the first capacitor element and a negative-electrode-side main terminal of the first direct-current terminal and a fourth inductance component in a conductor portion that electrically connects a negative-electrode-side terminal of the second capacitor element and a negative-electrode-side main terminal of the first direct-current terminal are configured to be approximately same.

Advantageous Effects of Invention

According to the present invention, an effect is obtained where it is possible to suppress fluctuations in temperature rises among the capacitor elements and restrain deterioration in the performance and the life of the filter capacitor.

BRIEF DESCRIPTION OF DRAWINGS

FIG. 5 is a table showing a first simulation result.

FIG. 8 is a table showing a second simulation result.

DESCRIPTION OF EMBODIMENTS

A power converter according to an embodiment of the present invention is explained below with reference to the accompanying drawings. Note that the present invention is not limited by the embodiment explained below.

Embodiment

Figure 1:
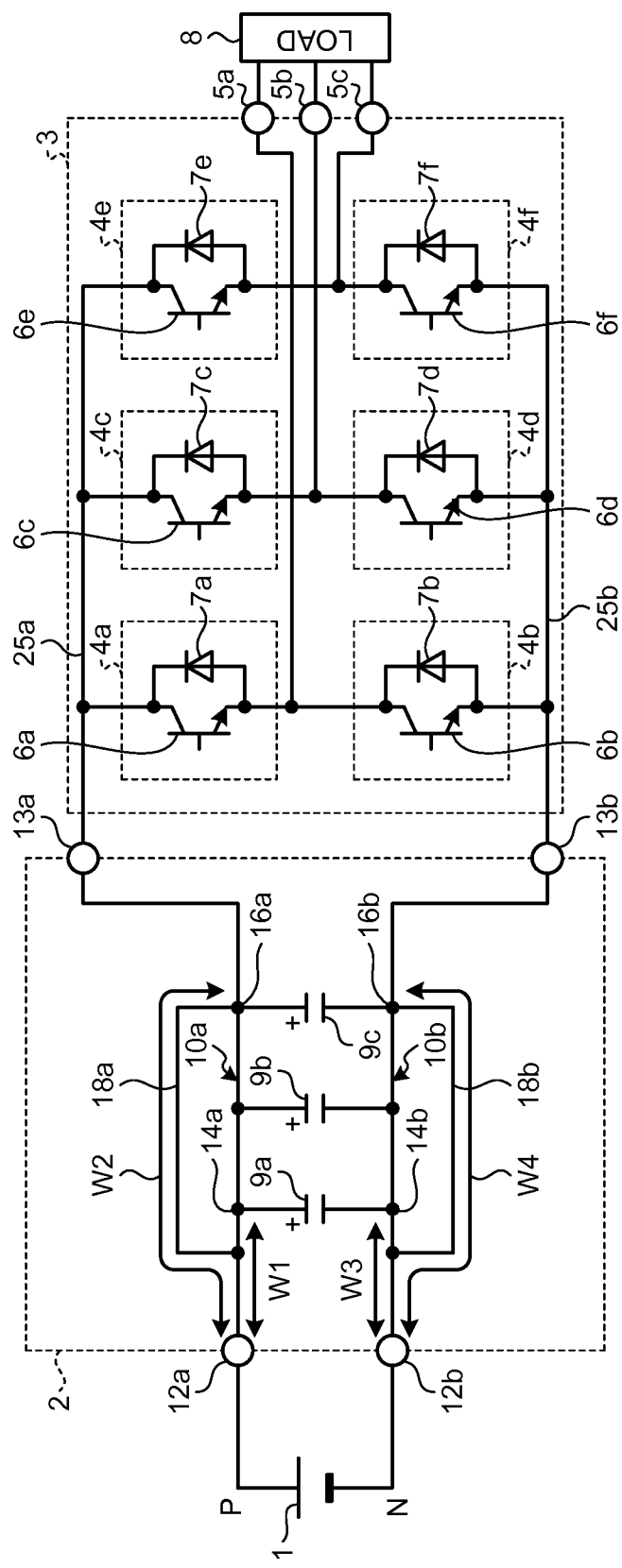
FIG. 1 is a diagram of a circuit configuration of a power converter according to the present embodiment.

FIG. 1 is a diagram of a circuit configuration of a power converter according to an embodiment of the present invention. In FIG. 1, the power converter according to the embodiment is configured to include a filter capacitor 2 that receives a direct-current voltage from a direct-current power supply 1 and an inverter unit 3 that drives a load 8 using the charge (electric energy) accumulated in the filter capacitor 2.

The direct-current power supply 1 is a supply source of direct-current power and has the potentials of an anode P and a cathode N. The filter capacitor 2 is configured to include a plurality of capacitor elements 9a to 9c connected in parallel to one another. The filter capacitor 2 is provided with a positive-electrode-side main terminal 12a connected to the anode P of the direct-current power supply 1, a negative-electrode-side main terminal 12b connected to the cathode N of the direct-current power supply 1, and a positive-electrode-side main terminal 13a and a negative-electrode-side main terminal 13b that are connected to the inverter unit 3 and transmit accumulated electric energy to the inverter unit 3. Among these terminals, the positive-electrode-side main terminal 12a and the negative-electrode-side main terminal 12b configure a pair of first direct-current terminals and the positive-electrode-side main terminal 13a and the negative-electrode-side main terminal 13b configure a pair of second direct-current terminals.

The inverter unit 3 is configured to include switching elements 6a to 6f and diodes 7a to 7f. In the inverter unit 3, the switching element 6a and the diode 7a, the switching element 6c and the diode 7c, and the switching element 6e and the diode 7e, each of which form a pair, are connected in anti-parallel with each other to configure upper arms 4a, 4c, and 4e, and the switching element 6b and the diode 7b, the switching element 6d and the diode 7d, and the switching element 6f and the diode 7f, each of which form a pair, are connected in anti-parallel with each other to configure lower arms 4b, 4d, and 4f. The upper arms 4a, 4c, and 4e and the lower arms 4b, 4d, and 4f are connected, respectively, in series such that each pair configures one leg. A plurality of (in an example shown in the figure, three) legs are provided and connected in parallel. One ends of the legs are connected to a direct-current bus 25a and the other ends of the legs are connected to a direct-current bus 25b to configure a bridge circuit. An example shown in the figure is a three-phase inverter circuit. There are three connection points of the upper arms 4a, 4c, and 4e and the lower arms 4b, 4d, and 4f and the connection points are drawn out to form a U-phase terminal 5a, a V-phase terminal 5b, and a W-phase terminal 5c in the inverter unit 3 and connected to the load 8.

Next, the connection configuration of the capacitor elements 9a to 9c is explained.

In FIG. 1, the positive electrodes of the capacitor elements 9a to 9c are connected to a positive-electrode-side conductor 10a that forms a direct-current bus on the positive-electrode side by electrically connecting the positive-electrode-side main terminal 12a of the first direct-current terminals and the positive-electrode-side main terminal 13a of the second direct-current terminals. Similarly, the negative electrodes of the capacitor elements 9a to 9c are connected to a negative-electrode-side conductor 10b that forms a direct-current bus on the negative-electrode side by electrically connecting the negative-electrode-side main terminal 12b of the first direct-current terminals and the negative-electrode-side main terminal 13b of the second direct-current terminals.

In addition to the configuration explained above, in the filter capacitor 2 according to the present embodiment, the positive electrode of the capacitor element 9a located at the end on one side and the positive electrode of the capacitor element 9c located at the end on the other side in an electrical connection form are electrically connected by a positive-electrode-side conductor 18a different from the positive-electrode-side conductor 10a. In this case, the capacitor elements 9a and 9c are arranged such that a first conductor path length W1, which is the length along the connection conductor between a positive-electrode-side terminal 14a that is the positive-electrode-side connection point for the capacitor element 9a and the positive-electrode-side main terminal 12a of the first direct-current terminals, and a second conductor path length W2 between a positive-electrode-side terminal 16a that is the positive-electrode-side connection point for the capacitor element 9c and the positive-electrode-side main terminal 12a of the first direct-current terminals are approximately the same.

The configuration on the negative-electrode side is the same as the configuration explained above. The negative electrode of the capacitor element 9a and the negative electrode of the capacitor element 9c are electrically connected by a negative-electrode-side conductor 18b different from the negative-electrode-side conductor 10b, and the capacitor elements 9a and 9c are arranged such that a third conductor path length W3 between a negative-electrode-side terminal 14b that is the negative-electrode-side connection point for the capacitor element 9a and the negative-electrode-side main terminal 12b of the first direct-current terminals and a fourth conductor path length W4 between a negative-electrode-side terminal 16b that is the negative-electrode-side connection point for the capacitor element 9c and the negative-electrode-side main terminal 12b of the first direct-current terminals are approximately the same.

Figure 2:
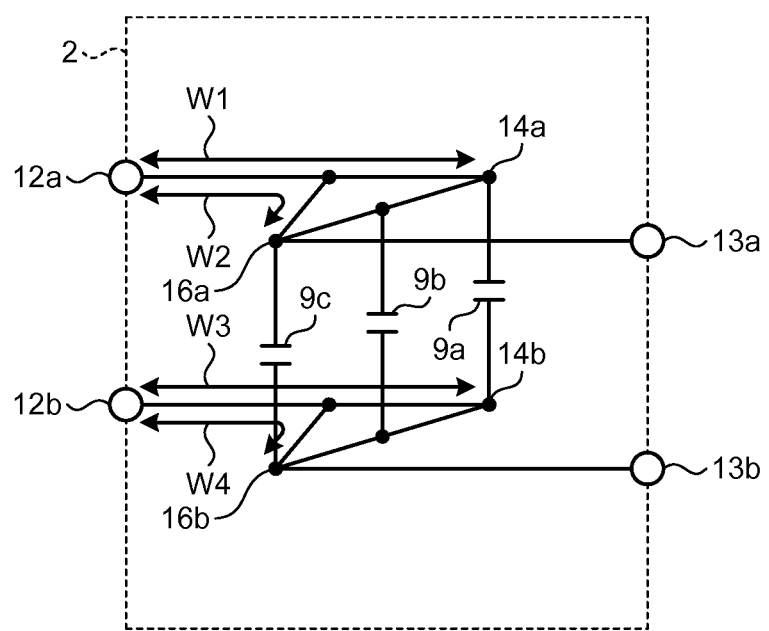
FIG. 2 is a diagram in which a connection configuration of a filter capacitor according to the present embodiment is more accurately shown according to an actual state.

Note that FIG. 1 is a circuit diagram showing a connection relation among the capacitor elements. Therefore, the conductor path lengths shown in the figure do not represent actual lengths. The actual arrangement configuration is as shown in FIG. 2.

Simulation models according to the present application and a comparative example are explained.

Figure 3:
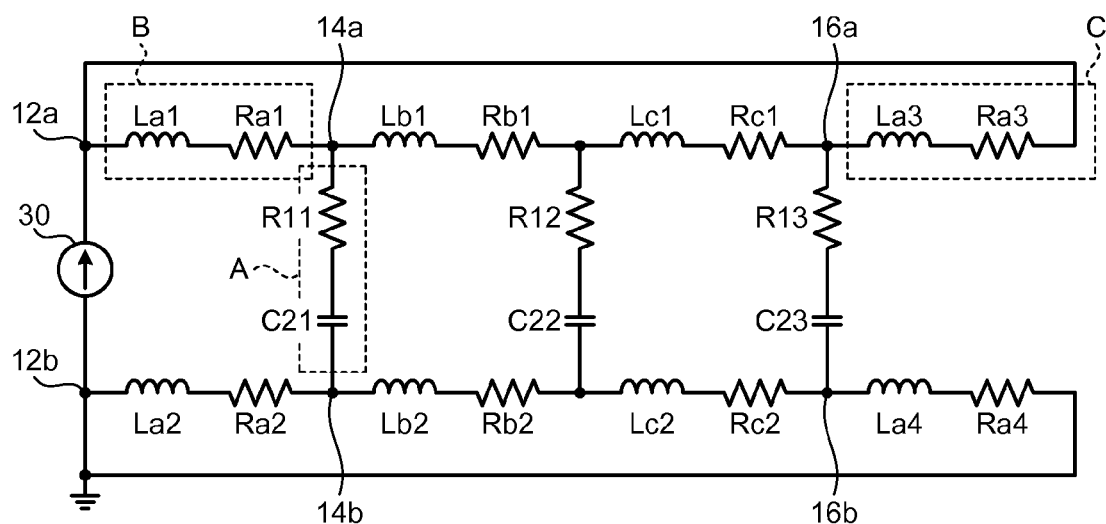
FIG. 3 is a diagram of a simulation model that simulates a circuit unit of the filter capacitor according to the present embodiment.

FIG. 3 is a simulation model that simulates a circuit unit of the filter capacitor 2 according to the present embodiment. In FIG. 3, the portion indicated by a broken line part A simulates the capacitor element 9a itself and can be represented by a series circuit of a capacitor C21 representing the capacitance of the capacitor element 9a and a resistor R11 representing a resistance component of the capacitor element 9a.

The portion indicated by a broken line part B corresponds to a portion of the first conductor path length W1 between the positive-electrode-side main terminal 12a of the first direct-current terminals and the positive-electrode-side terminal 14a of the capacitor element 9a and can be represented by a series circuit of a resistor Ra1 representing a resistance component of a connection conductor present in the portion of the first conductor path length W1 and an inductor La1 representing an inductance component (a first inductance component) of the portion.

Similarly, the portion indicated by a broken line part C corresponds to a portion of the second conductor path length W2 between the positive-electrode-side main terminal 12a of the first direct-current terminals and the positive-electrode-side terminal 16a of the capacitor element 9c and can be represented by a series circuit of a resistor Ra3 representing a resistance component of a connection conductor present in the portion of the second conductor path length W2 and an inductor La3 representing an inductance component (a second inductance component) of the portion.

The other portions can be represented in the same way. The circuit unit of the filter capacitor 2 according to the present embodiment has a configuration of a ladder circuit shown in FIG. 3 (R11 to R13, Ra1 to Ra4, Rb1, Rb2, Rc1, Rc2, La1 to La4, Lb1, Lb2, Lc1, and Lc2). Note that, in order to simulate the direct-current power supply 1, a current source 30 is inserted between the positive-electrode-side main terminal 12a and the negative-electrode-side main terminal 12b.

Figure 4:
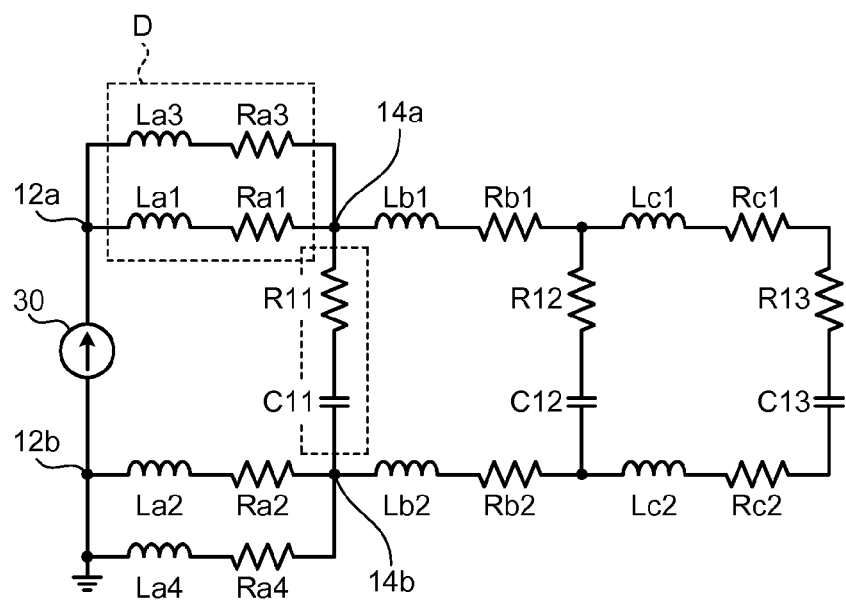
FIG. 4 is a diagram of a simulation model that simulates a circuit unit of a filter capacitor presented as a comparative example.

FIG. 4 is a simulation model that simulates a circuit unit of a filter capacitor presented as a comparative example. The filter capacitor indicated by the simulation model shown in FIG. 4 has a configuration in which the positive-electrode-side terminal 16a of the capacitor element 9c and the positive-electrode-side main terminal 12a of the first direct-current terminals are not connected and the negative-electrode-side terminal 16b of the capacitor element 9c and the negative-electrode-side main terminal 12b of the first direct-current terminals are not connected. That is, in the filter capacitor shown in FIG. 4, only the capacitor element 9a is directly connected to the positive-electrode-side main terminal 12a and the negative-electrode-side main terminal 12b, which are the first direct-current terminals, and other configurations are the same as or equivalent to those shown in FIG. 3.

As indicated by a broken line part D in FIG. 4, parallel circuits are formed between the positive-electrode-side main terminal 12a and the positive-electrode-side terminal 14a and between the negative-electrode-side main terminal 12b and the negative-electrode-side terminal 14b such that the impedance viewed from the current source 30 is equivalent to the impedance in FIG. 3. Note that the capacitors are denoted by difference signs to distinguish between the circuit shown in FIG. 3 and the circuit shown in FIG. 4.

Next, the result of the simulation (a first simulation) performed on the simulation models shown in FIG. 3 and FIG. 4 is explained. Note that the circuit constants in the simulation models are as described below.

(1) Capacitances of the capacitor elements (capacitors)
    $C11=C12=C13=C21=C22=C23=666$ (μF)
(2) Capacitor elements—inductance components among the main terminals
    $La1=La2=La3=La4=50$ (nH)
(3) Inductance components among the capacitor elements
    $Lb1=Lb2=Lc1=Lc2=10$ (nH)
(4) Current source
    Sine wave having a peak value of 1000 (A)
    In order to simulate a current change (di/dt) during switching, the frequency is variable (10 kHz to 1 MHz)

Figure 6:
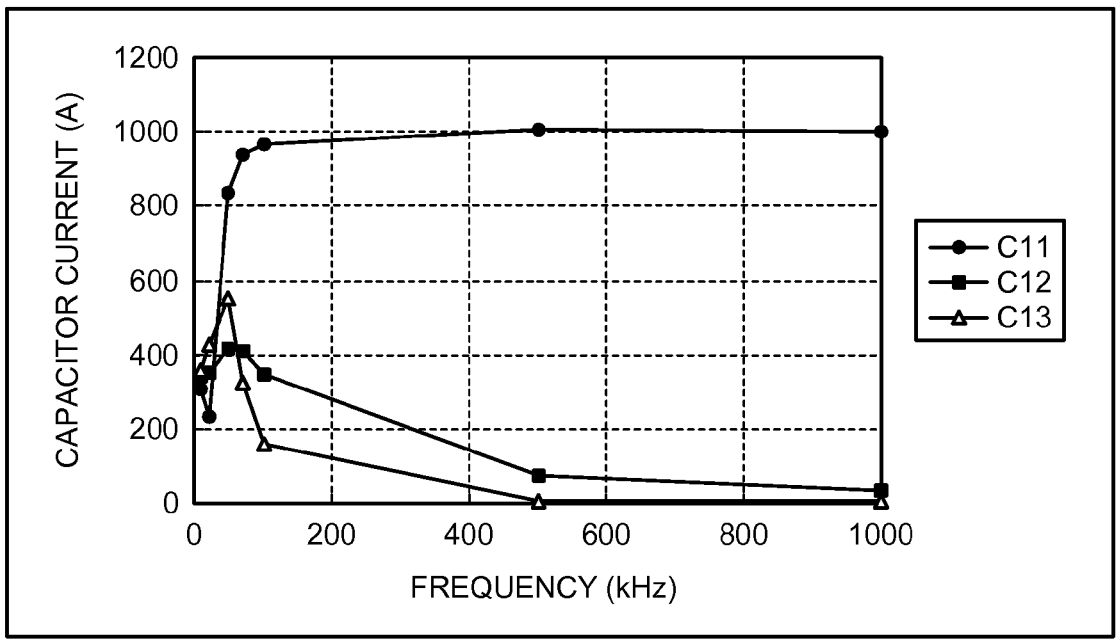
FIG. 6 is a graph showing a first simulation result for capacitor elements of the comparative example.
Figure 7:
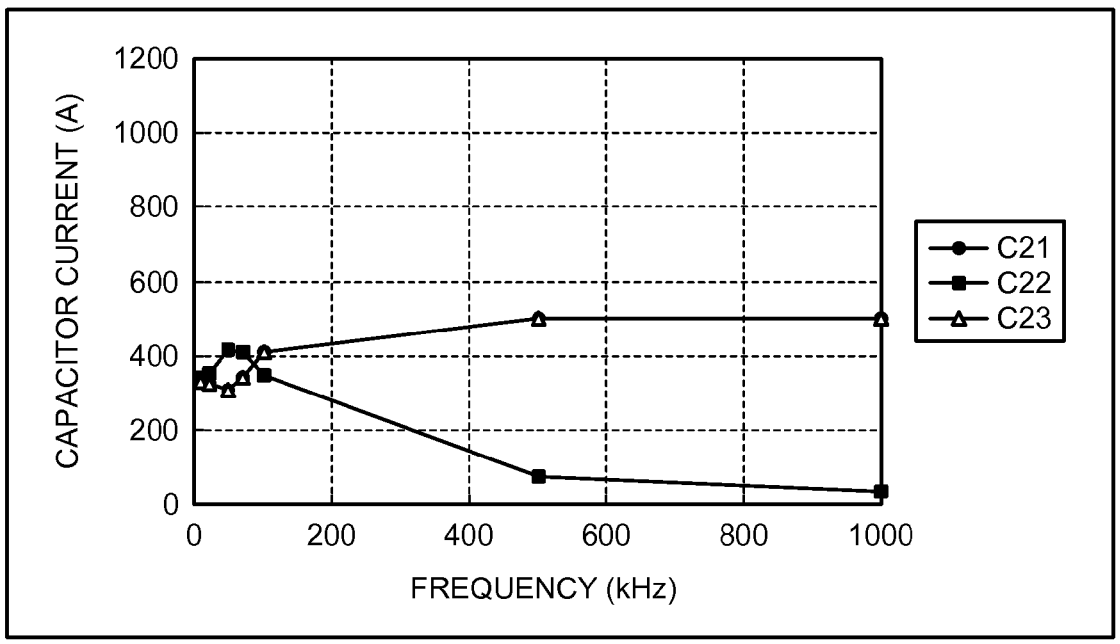
FIG. 7 is a graph showing a first simulation result for capacitor elements of the present application.

FIG. 5 is a simulation result obtained when the first simulation is performed. In FIG. 5, the magnitudes (effective values) of the electric currents flowing to the capacitor elements when the frequency of the current source is varied in a range of 10 kilohertz to 1 megahertz are shown. In FIG. 5, the current values shown in the left half indicate current values flowing to the capacitors C11, C12, and C13 shown in FIG. 4 (the comparative example) and the current values shown in the right half indicate current values flowing to the capacitors C21, C22, and C23 shown in FIG. 3 (the present application). FIG. 6 is a graph showing changes in electric currents flowing to the capacitors C11, C12 and C13. FIG. 7 is a graph showing changes in electric currents flowing to the capacitors C21, C22, and C23.

FIG. 5 to FIG. 7 clarify the matters described below.
(1) When the frequency is about 10 kilohertz, almost no current difference among the capacitor elements is seen in both the present application and the comparative example.
(2) In the case of the present application, at least at the frequency up to about 100 kilohertz, a current difference among the capacitor elements is small. In the case of the present application, a significant difference is seen in the current difference among the capacitor elements between 100 kilohertz and 500 kilohertz.
(3) In the case of the comparative example, a significant difference is seen in the current difference among the capacitor elements from about 20 kilohertz.
(4) In the case of the present application, an electric current is equally distributed to the capacitor C21 (the capacitor element 9a) and the capacitor C23 (the capacitor element 9c).
(5) In the case of the comparative example, in a relation between the capacitor C11 and the capacitor C13, the electric current is equally distributed up to the frequency of about 10 kilohertz. However, as the frequency increases, the electric current becomes unequal. When the frequency exceeds 50 kilohertz, the electric current flowing to the capacitor C11 becomes extremely large. When the frequency exceeds 500 kilohertz, the electric current hardly flows to the other capacitor elements.

Note that, in the simulation result shown in FIG. 5, the sum of the electric currents at each of the frequencies flowing to the capacitor elements is not equal among the frequencies. This is because a phase difference is present among the electric currents flowing to the capacitor elements. As can be understood from the result shown in FIG. 5, in the case of the comparative example, it is seen that the sum of the electric currents flowing to the capacitor elements is larger than the current value (1000 amperes) from the current source and the phase difference among the electric currents flowing to the capacitor elements is large between 50 kilohertz and 100 kilohertz. In contrast, in the case of the present application, it is seen that the sum of the electric currents flowing to the capacitor elements is larger than the current value (1000 amperes) of the current source around 100 kilohertz and the phase difference among the electric currents flowing to the capacitor elements is small at least at the frequency equal to or lower than 70 kilohertz and at the frequency equal to or higher than 500 kilohertz.

Figure 9:
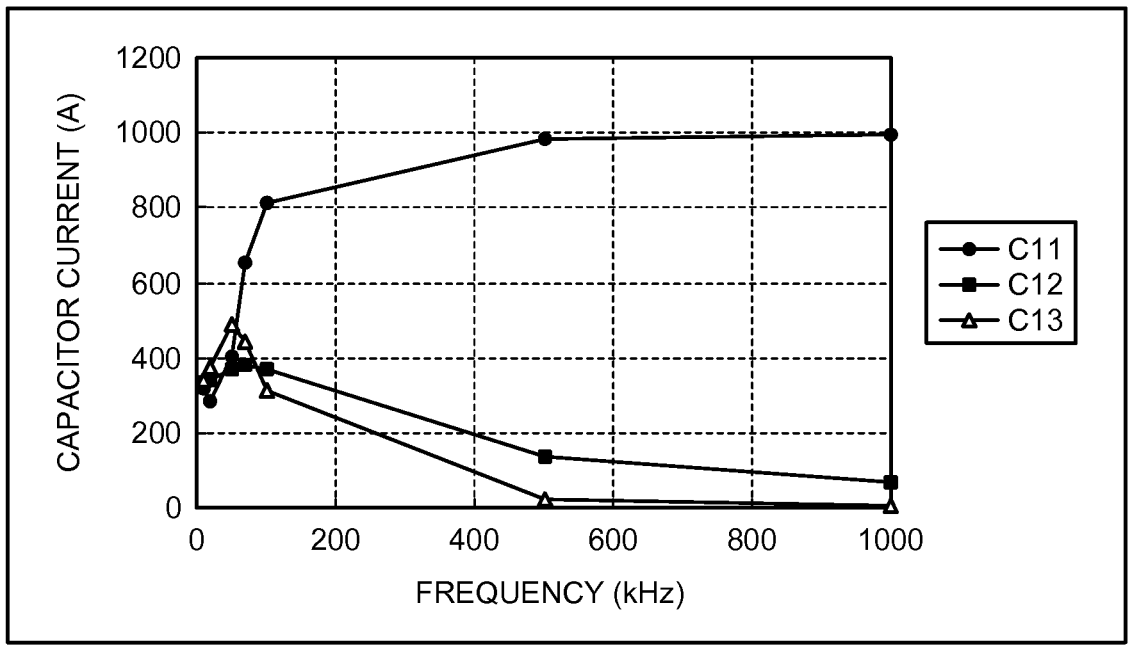
FIG. 9 is a graph showing a second simulation result for the capacitor elements of the comparative example.

Next, the result of the simulation (a second simulation) performed when the inductance values among the capacitor elements are changed is explained with reference to FIG. 8 to FIG. 10. Note that, in the second simulation, the circuit constants explained above are used except that the inductances Lb1, Lb2, Lc1, and Lc2 among the capacitor elements are changed to "5 (nH)".

Figure 10:
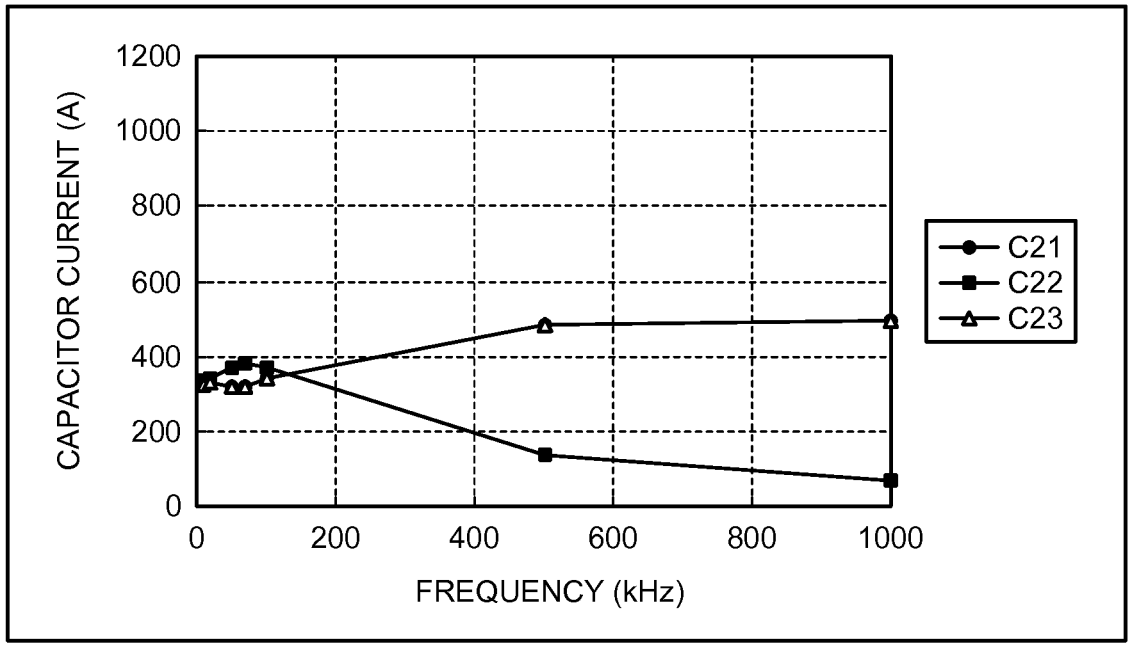
FIG. 10 is a graph showing a second simulation result for the capacitor elements of the present application.

First, in the case of the present application, as is apparent from the comparison between FIG. 7 and FIG. 10, differences are hardly seen in both the magnitudes of the current values and tendencies of changes in the current values. Therefore, in the case of the present application, it can be understood that the current values are hardly affected by the inductance values among the capacitor elements.

In the case of the comparative example, although the change rates of the current changes in the capacitor C11 and the capacitor C13 are slightly small, tendencies of current changes are similar. Therefore, in the comparative example also, it can be said that the current values are hardly affected by the inductance values among the capacitor elements.

Note that, as briefly explained above, in the recent power converter, there is a tendency to increase the carrier frequency and increase the switching speed. For example, switching control for increasing the carrier frequency to 36 kilohertz or 52 kilohertz is actually performed. Therefore, when it is assumed that the switching elements are controlled at high speed at such a carrier frequency, for example, in the case of the comparative example, as explained in (3) above, a significant difference appears in the current difference among the capacitor elements and fluctuations in temperature rises occur among the capacitor elements. Actually, referring to the simulation result shown in FIG. 4, when the ratio of the maximum and the minimum of the electric current flowing to the capacitor elements is represented as IR, for example, IR=1.86 at 20 kilohertz, IR=2.02 at 50 kilohertz, and IR=2.90 at 70 kilohertz.

In contrast, in the case of the present application, for example, IR=1.10 at 20 kilohertz, IR=1.35 at 50 kilohertz, and IR=1.20 at 70 kilohertz. From these results, in the case of the present application, it can be said that fluctuations in temperature rises among the capacitor elements are suppressed and equalization of the amount of heat generated is attained among the capacitor elements.

As explained above, in the present embodiment, in the filter capacitor including the three capacitor elements including the first capacitor element located at the end on one side in the electrical connection form and the second capacitor element located at the end on the other side in the electrical connection form, a pair of direct-current terminals (the first direct-current terminals) including the positive-electrode-side main terminal and the negative-electrode-side main terminal, which receive a direct-current voltage, are provided. The first conductor path length between the positive-electrode-side terminal of the first capacitor element and the positive-electrode-side main terminal of the first direct-current terminals and the second conductor path length between the positive-electrode-side terminal of the second capacitor element and the positive-electrode-side main terminal of the first direct-current terminals are configured to be approximately the same. The third conductor path length between the negative-electrode-side terminal of the first capacitor element and the negative-electrode-side main terminal of the first direct-current terminals and the fourth conductor path length between the negative-electrode-side terminal of the second capacitor element and the negative-electrode-side main terminal of the first direct-current terminals are configured to be approximately the same. Therefore, in a desired frequency band in an operation region of the power converter, it is possible to suppress fluctuations in temperature rises among the capacitor elements and restrain deterioration in the performance and the life of the filter capacitor.

Note that, in the example explained in the present embodiment, the present invention is applied to the filter capacitor including the three capacitor elements. However, the present invention is not limited to the embodiment and can be applied to a filter capacitor including two capacitor elements and can be applied to a filter capacitor including four or more capacitor elements.

In the present embodiment, the first conductor path length and the second conductor path length are configured to be approximately the same and the third conductor path length and the fourth conductor path length are configured to be approximately the same. However, the present invention is not limited to this configuration. Specifically, if the positive-electrode-side terminal of the third capacitor element (in the example in the embodiment, the capacitor element 9b) located between the first capacitor element and the second capacitor element and the positive-electrode-side main terminal of the first direct-current terminals are electrically connected by an positive-electrode-side conductor different from the positive-electrode-side conductor 10a forming the direct-current bus on the positive-electrode side and the conductor path length along the positive-electrode-side conductor is configured to be approximately the same as the first conductor path length and the second conductor path length, and the negative-electrode-side terminal of the third capacitor element and the negative-electrode-side main terminal of the first direct-current terminals are electrically connected by a negative-electrode-side conductor different from the negative-electrode-side conductor 10b forming the direct-current bus on the negative-electrode side and the conductor path length along the negative-electrode-side conductor is configured to be approximately the same as the third conductor path length and the fourth conductor path length, it is possible to further improve the suppression effect of fluctuations in temperature rises among the capacitor elements. Note that this method is also applicable to a filter capacitor including four or more capacitor elements.

Figure 11:
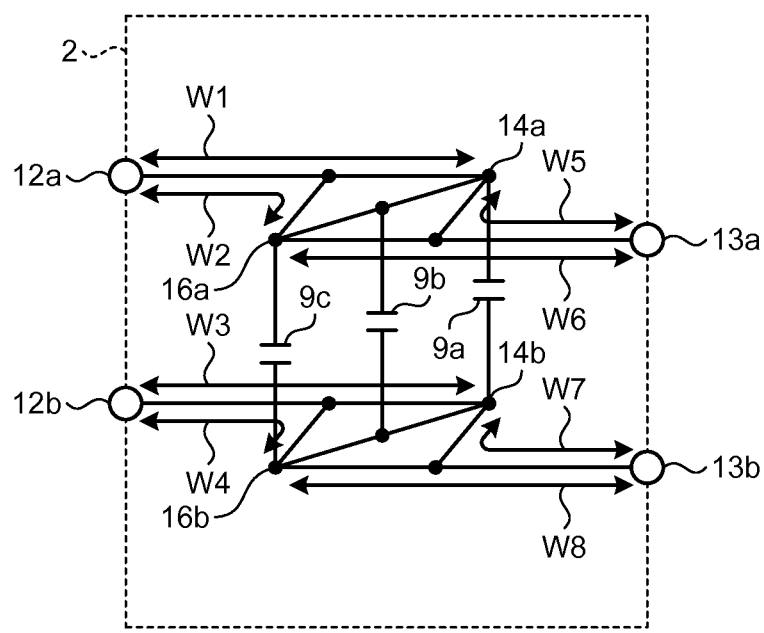
FIG. 11 is a diagram of the connection configuration shown in FIG. 2 and a connection configuration of a filter capacitor in which conductor route lengths on the side of second direct-current terminals, which are main terminals on an inverter unit side, are set approximately the same.

In the present embodiment, the conductor path lengths on the side of the first direct-current terminals, which are the main terminals on the direct-current power supply 1 side, are configured to be approximately the same. However, the conductor path lengths on the side of the second direct-current terminals, which are the main terminals on the inverter unit 3 side, can be configured to be approximately the same. For example, when the inverter unit 3 performs a regenerative operation, the roles of the first direct-current terminals and the second direct-current terminals are reversed. The second direct-current terminals function as terminals that receive a direct-current voltage output by the inverter unit 3 (the first direct-current terminals function as terminals that transmit electric energy of the filter capacitor 2 to the direct-current power supply 1). Therefore, as shown in FIG. 11, in addition to the connection configuration shown in FIG. 2, if the capacitor elements 9a and 9c are arranged such that a fifth conductor path length W5, which is the length along the connection conductor between the positive-electrode-side terminal 14a that is the positive-electrode-side connection point for the capacitor element 9a and the positive-electrode-side main terminal 13a of the second direct-current terminals, and a sixth conductor path length W6 between the positive-electrode-side terminal 16a that is the positive-electrode-side connection point for the capacitor element 9c and the positive-electrode-side main terminal 13a of the second direct-current terminals are approximately the same and a seventh conductor path length W7 between the negative-electrode-side terminal 14b that is the negative-electrode-side connection point for the capacitor element 9a and the negative-electrode-side main terminal 13b of the second direct-current terminals and an eighth conductor path length W8 between the negative-electrode-side terminal 16b that is the negative-electrode-side connection point for the capacitor element 9c and the negative-electrode-side main terminal 13b of the second direct-current terminals are approximately the same, it is possible to further increase the suppression effect of fluctuations in temperature rises among the capacitor elements.

Note that, as the gist explained in the present embodiment, the first conductor path length and the second conductor path length are configured to be approximately the same and the third conductor path length and the fourth conductor path length are configured to be approximately the same. However, the configuration for matching the conductor path lengths is not only the gist of the present invention. As an essential point, it is satisfactory that the inductance component of the portion of the first conductor path length and the inductance component of the portion of the second conductor path length are configured to be approximately the same and the inductance component of the portion of the third conductor path length and the inductance component of the portion of the fourth conductor path length are configured to be approximately the same. Such a configuration also forms the gist of the present invention.

Figure 12:
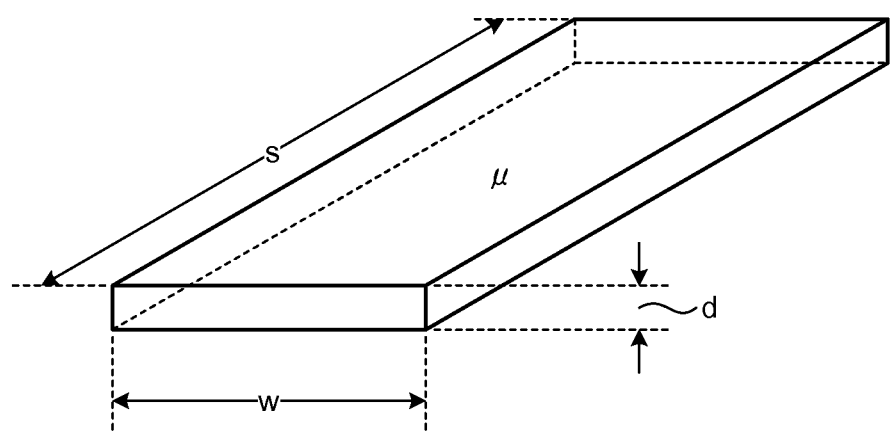
FIG. 12 is a diagram of an example in which a connection conductor is a plate-shaped conductor.

For example, when a plate-shaped conductor shown in FIG. 12 is used as a connection conductor, the inductance (self-inductance) component of the connection conductor relates to the magnetic permeability μ, width w, thickness (height) d, and length s of the connection conductor. Specifically, when the magnetic permeability μ is the same, the inductance decreases as the width w increases, the inductance decreases as the thickness d increases, and the inductance increases as the length s increases. Therefore, even if the conductor path lengths are different, it is possible to adjust the magnitudes of the inductance components by varying the parameter elements of the width w, the thickness d, and the length s. An electric current flowing to the connection conductor has a characteristic that the electric current gathers near the surface as the frequency increases (a skin effect). Therefore, when the switching frequency is high, the influence of the thickness d decreases. Therefore, it is satisfactory that the parameter elements of the width w and the length s are varied. Note that, in this explanation, the magnetic permeability μ is the same. However, it goes without saying the magnetic permeability μ can be different.

In the present embodiment, as the inverter unit connected to the filter capacitor, the three-phase bridge circuit including the three legs each configured by connecting the upper arm and the lower arm in series is explained as an example; however, the present invention is not limited to this configuration. The present invention can also be applied to a half bridge circuit including one leg and a single-phase bride circuit including two legs. The present invention can also be applied to a multi-phase bridge circuit including four or more legs.

Lastly, the switching element used in the inverter unit 3 of the power converter is explained. The switching element used in the inverter unit 3 is generally a switching element having a configuration in which a semiconductor transistor element (IGBT, MOSFET, etc.) formed of silicon (Si) and a semiconductor diode element also formed of silicon are connected in anti-parallel with each other. The technology explained above can be used for the inverter unit 3 including the general switching element.

On the other hand, the technology is not limited to the switching element formed of Si. It is obvious that it is possible to use, in the inverter unit 3, a switching element formed of silicon carbide (SiC), which attracts attention as a material for enabling a high-speed switching operation in recent years, instead of Si.

The switching element formed of SiC can perform a high-speed switching operation because SiC can be used at high temperature and has high heat resistance and, therefore, it is possible to raise an allowable operating temperature of a switching element module to a high-temperature side and, even if the carrier frequency is increased to increase the switching speed, it is possible to suppress a heat sink from being increased in size.

However, although the increase in the switching speed is effective in terms of improving the efficiency of the power converter, the degree of influence on the filter capacitor viewed from the filter capacitor side increases as explained above. That is, the present invention in the present application effectively acts when the switching element formed of SiC is used. It is no exaggeration to say that the present invention forms one of technologies flexibly adaptable to a future trend.

Note that SiC is an example of a semiconductor referred to as a wide band gap semiconductor due to its characteristic being that SiC has a larger bandgap than Si. Besides SiC, for example, a semiconductor made of a gallium nitride material or diamond also belongs to wide band gap semiconductors and the characteristics thereof have a lot of similarities to those of SiC. Therefore, when a wide band gap semiconductor other than SiC is used in the inverter unit, effects same as the effects obtained when SiC is used are obtained.

INDUSTRIAL APPLICABILITY

As explained above, the power converter according to the present invention is useful as an invention that can suppress fluctuations in temperature rises among a plurality of capacitor elements and restrain deterioration in the performance and the life of a filter capacitor.

REFERENCE SIGNS LIST 1 direct-current power supply
2 filter capacitor 3 inverter unit
4a, 4c, 4e upper arm
4b, 4d, 4f lower arm
5a U-phase terminal
5b V-phase terminal
5c W-phase terminal
6a to 6f switching element
7a to 7f diode
8 load
9a to 9c capacitor element
10a, 18a positive-electrode-side conductor
10b, 18b negative-electrode-side conductor
12a positive-electrode-side main terminal (first direct-current terminal)
12b negative-electrode-side main terminal (first direct-current terminal)
13a positive-electrode-side main terminal (second direct-current terminal)
13b negative-electrode-side main terminal (second direct-current terminal)
14a, 16a positive-electrode-side terminal
14b, 16b negative-electrode-side terminal
25a, 25b direct-current bus
30 current source
C11, C12, C13 capacitor (comparative example)
C21, C22, C23 capacitor (the present application)
La1 to La4, Lb1, Lb2, Lc1, Lc2 inductor
Ra1 to Ra4, Rb1, Rb2, Rc1, Rc2 resistor
N cathode
P anode
W1 first conductor path length
W2 second conductor path length
W3 third conductor path length
W4 fourth conductor path length
W5 fifth conductor path length
W6 sixth conductor path length
W7 seventh conductor path length
W8 eighth conductor path length

The invention claimed is:

1. A power converter that includes a filter capacitor that receives a direct-current voltage from a direct-current power supply and an inverter unit that drives a load using electric energy accumulated in the filter capacitor, wherein
in the filter capacitor, a plurality of capacitor elements connected in parallel are provided and a first direct-current terminal, which includes a positive-electrode-side main terminal and a negative-electrode-side main terminal that receive a direct-current voltage from the direct-current power supply, is provided,
a first capacitor element is located on one end side in an electrical connection form among the capacitor elements, and a second capacitor element is located on another end side in the electrical connection form,
a first conductor portion electrically connects a positive-electrode-side terminal of the first capacitor element to the positive-electrode-side main terminal of the first direct-current terminal,
a second conductor portion electrically connects a positive-electrode-side terminal of and the second capacitor element to the positive-electrode-side main terminal of the first direct-current terminal,
an inductance component of the first conductor portion and an inductance component of the second conductor portion are configured to be the same value,
a third conductor portion electrically connects a negative-electrode-side terminal of the first capacitor element to a negative-electrode-side main terminal of the first direct-current terminal;
a fourth conductor portion electrically connects a negative-electrode-side terminal of the second capacitor element to a negative-electrode-side main terminal of the first direct-current terminal; and
an inductance component of the third conductor portion and an inductance component of the fourth conductor portion are configured to be the same value.

2. The power converter according to claim 1, wherein
in the filter capacitor, one or more third capacitor elements other than the first and second capacitor elements are provided,
a positive-electrode-side terminal in at least one capacitor element among the third capacitor elements and the positive-electrode-side main terminal of the first direct-current terminal are connected by a connection conductor that is different from a connection conductor for forming the electrical connection form and an inductance component of a portion of the connection conductor is configured to be the same value as the first inductance component, and
a negative-electrode-side terminal in the one capacitor element and the negative-electrode-side main terminal of the first direct-current terminal are connected by a connection conductor that is different from a connection conductor for forming the electrical connection form and an inductance component of a portion of the connection conductor is configured to be the same value as the third inductance component.

3. The power converter according to claim 1, wherein a first conductor path length, which is a length along a conductor portion forming the first inductance component, and a second conductor path length, which is a length along a conductor portion forming the second inductance component, are configured to be the same and a third conductor path length, which is a length along a conductor portion forming the third inductance component, and a fourth conductor path length, which is a length along a conductor portion forming the fourth inductance component, are configured to be the same.

4. The power converter according to claim 3, wherein
in the filter capacitor, one or more third capacitor elements other than the first and second capacitor elements are provided,
a positive-electrode-side terminal in at least one capacitor element among the third capacitor elements and the positive-electrode-side main terminal of the first direct-current terminal are connected by a connection conductor that is different from a connection conductor for forming the electrical connection form and a conductor path length along the connection conductor is configured to be the same as the first conductor path length, and
a negative-electrode-side terminal in the one capacitor element and the negative-electrode-side main terminal of the first direct-current terminal are connected by a connection conductor that is different from a connection conductor for forming the electrical connection form and a conductor path length along the connection conductor is configured to be the same as the third conductor path length.

5. The power converter according to claim 1, wherein
in the filter capacitor, a second direct-current terminal, which is connected to the inverter unit and includes a positive-electrode-side main terminal and a negative-electrode-side main terminal that transmit accumulated electric energy to the inverter unit, is provided, and a fifth inductance component in a conductor portion that electrically connects a positive-electrode-side terminal of the first capacitor element and a positive-electrode-side main terminal of the second direct-current terminal and a sixth inductance component in a conductor portion that electrically connects a positive-electrode-side terminal of the second capacitor element and a positive-electrode-side main terminal of the second direct-current terminal are configured to be the same value and a seventh inductance component in a conductor portion that electrically connects a negative-electrode-side terminal of the first capacitor element and a negative-electrode-side main terminal of the second direct-current terminal and an eighth inductance component in a conductor portion that electrically connects a negative-electrode-side terminal of the second capacitor element and a negative-electrode-side main terminal of the second direct-current terminal are configured to be the same value.

6. The power converter according to claim 5, wherein a fifth conductor path length, which is a length along a conductor portion forming the fifth inductance component, and a sixth conductor path length, which is a length along a conductor portion forming the sixth inductance component, are configured to be the same value and a seventh conductor path length, which is a length along a conductor portion forming the seventh inductance component, and an eighth conductor path length, which is a length along a conductor portion forming the eighth inductance component, are configured to be the same value.

7. The power converter according to claim 1, wherein, in the inverter unit, a switching element formed of a wide band gap semiconductor is used.

8. The power converter according to claim 7, wherein the wide band gap semiconductor is a semiconductor using silicon carbide, a gallium nitride material, or diamond.

* * * * *